US012798578B2

(12) United States Patent
Inada et al.

(10) Patent No.: US 12,798,578 B2
(45) Date of Patent: Nov. 17, 2026

(54) DRIVING ASSISTANCE APPARATUS AND DRIVING ASSISTANCE METHOD

(71) Applicant: HONDA MOTOR CO., LTD., Tokyo (JP)

(72) Inventors: Kyosuke Inada, Tokyo (JP); Masaki Nakagawara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 103 days.

(21) Appl. No.: 18/826,443

(22) Filed: Sep. 6, 2024

(65) Prior Publication Data

US 2025/0108806 A1 Apr. 3, 2025

(30) Foreign Application Priority Data

Sep. 29, 2023 (JP) ................................ 2023-170821

(51) Int. Cl.
*B60W 30/16* (2020.01)
*B60W 10/04* (2006.01)
(Continued)

(52) U.S. Cl.
CPC ............ *B60W 30/16* (2013.01); *B60W 10/04* (2013.01); *B60W 10/18* (2013.01); *B62J 45/412* (2020.02);
(Continued)

(58) Field of Classification Search
CPC ...... B60W 30/16; B60W 10/04; B60W 10/18; B60W 2300/36; B60W 2520/04;
(Continued)

(56) References Cited

U.S. PATENT DOCUMENTS 8,235,419 B1 * 8/2012 Giarrusso .............. B62K 11/06 280/301
8,851,499 B1 * 10/2014 Thompson ............. B62D 61/12 280/304
(Continued)

FOREIGN PATENT DOCUMENTS

CN 109960267 A * 7/2019 ........... G05D 1/0891
JP H02-141338 A 5/1990
(Continued)

OTHER PUBLICATIONS

Japanese Office Action for Japanese Patent Application No. 2023-170821 mailed on May 19, 2025.

*Primary Examiner* — Hunter B Lonsberry
*Assistant Examiner* — Harrison Heflin
(74) *Attorney, Agent, or Firm* — THOMAS | HORSTEMEYER, LLP

(57) ABSTRACT

A driving assistance apparatus mountable on a straddle type vehicle, comprising a first detection unit configured to detect a vehicle speed of the straddle type vehicle, a second detection unit configured to detect a preceding vehicle traveling in front of the straddle type vehicle, and a control unit configured to perform acceleration control and braking control of the straddle type vehicle, wherein when the vehicle speed of the straddle type vehicle is lower than a reference, the control unit performs follow-traveling with respect to the preceding vehicle by performing the acceleration control simultaneously with the braking control.

7 Claims, 4 Drawing Sheets

(51) Int. Cl.
*B60W 10/18* (2012.01)
*B62J 45/412* (2020.01)

(52) U.S. Cl.
CPC ..... *B60W 2300/36* (2013.01); *B60W 2520/04* (2013.01); *B60W 2520/10* (2013.01); *B60W 2554/4041* (2020.02); *B60W 2710/18* (2013.01); *B60W 2720/106* (2013.01)

(58) Field of Classification Search
CPC ..... B60W 2520/10; B60W 2554/4041; B60W 2710/18; B60W 2720/106; B62J 45/412
See application file for complete search history.

(56) References Cited

U.S. PATENT DOCUMENTS

| | | | | |
|---|---|---|---|---|
| 9,809,222 | B2 | 11/2017 | Kaneta et al. | |
| 10,730,516 | B2 | 8/2020 | Ohashi et al. | |
| 2016/0176402 | A1* | 6/2016 | Andersson | B60W 30/16 701/96 |
| 2017/0235307 | A1* | 8/2017 | Asakura | G05D 1/0061 701/23 |
| 2020/0398836 | A1* | 12/2020 | Wu | B60W 30/16 |
| 2023/0278558 | A1* | 9/2023 | Deljosevic | B60W 50/0098 701/96 |
| 2024/0001922 | A1* | 1/2024 | Ito | B60W 30/18009 |
| 2024/0101121 | A1* | 3/2024 | Jing | B60W 50/0097 |
| 2025/0214585 | A1* | 7/2025 | Pfau | B60W 30/181 |

FOREIGN PATENT DOCUMENTS

| | | | | |
|---|---|---|---|---|
| JP | 2016-034819 A | 3/2016 | | |
| JP | 2016-037254 A | 3/2016 | | |
| WO | WO-2007087255 A2 * | 8/2007 | | B62H 1/12 |
| WO | 2023/067705 A1 | 4/2023 | | |

* cited by examiner

DRIVING ASSISTANCE APPARATUS AND DRIVING ASSISTANCE METHOD

CROSS-REFERENCE TO RELATED APPLICATION(S)

This application claims priority to and the benefit of Japanese Patent Application No. 2023-170821, filed on Sep. 29, 2023, the entire disclosure of which is incorporated herein by reference.

BACKGROUND OF THE INVENTION

Field of the Invention

The present invention relates to a driving assistance apparatus in a vehicle.

Description of the Related Art

As a mode of driving assistance for assisting a part/all of a driving operation, there is technology for providing driving assistance of a self-vehicle so as to follow a preceding vehicle, and such technology can be referred to as adaptive cruise control (ACC) or the like.

In the ACC, it is conceivable that the vehicle speed of the preceding vehicle varies unexpectedly/regardless of the self-vehicle. WO 2023/067705 describes individually controlling a front wheel brake and a rear wheel brake to stabilize the vehicle body behavior while a motorcycle is turning, but does not consider a relation with the preceding vehicle.

SUMMARY OF THE INVENTION

The present invention relatively easily realizes driving assistance advantageous for stabilization of traveling in ACC.

One of the aspects of the present invention provides a driving assistance apparatus mountable on a straddle type vehicle, the driving assistance apparatus comprising: a first detection unit configured to detect a vehicle speed of the straddle type vehicle; a second detection unit configured to detect a preceding vehicle traveling in front of the straddle type vehicle; and a control unit configured to perform acceleration control and braking control of the straddle type vehicle, wherein when the vehicle speed of the straddle type vehicle is lower than a reference, the control unit performs follow-traveling with respect to the preceding vehicle by performing the acceleration control simultaneously with the braking control.

Further features of the present invention will become apparent from the following description of exemplary embodiments (with reference to the attached drawings).

DESCRIPTION OF THE EMBODIMENTS

Figure 1:
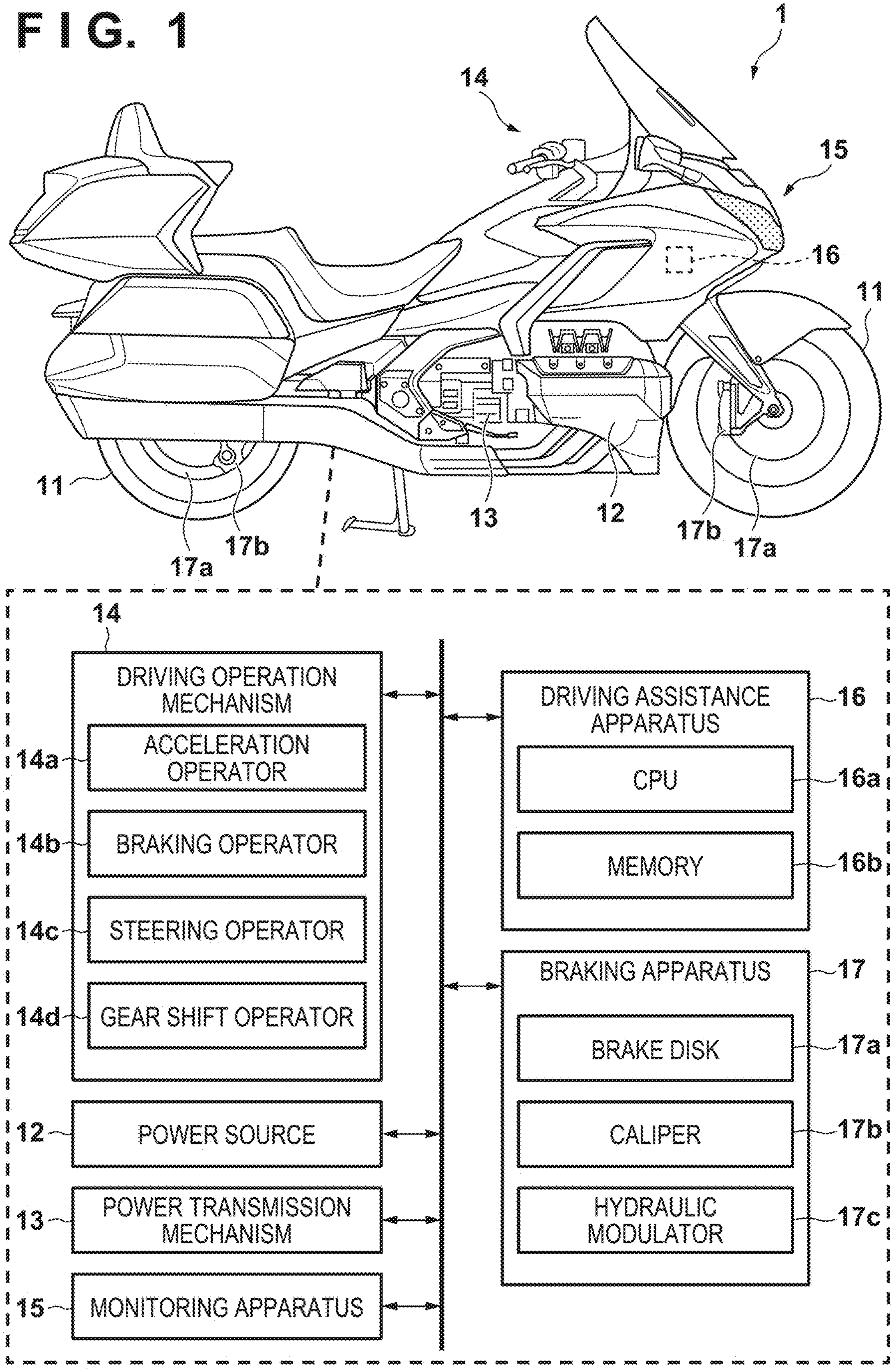
FIG. 1 is a diagram illustrating a configuration example of a straddle type vehicle according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 illustrates a configuration example of a straddle type vehicle 1 according to an embodiment. In the present embodiment, the straddle type vehicle 1 is a two-wheeled vehicle including a front wheel and a rear wheel as wheels 11, but the number of wheels is not limited to this example.

The straddle type vehicle 1 further includes a power source 12, a power transmission mechanism 13, a driving operation mechanism 14, a braking apparatus 17, and a monitoring apparatus 15. The power source 12 is configured to be able to generate power (rotation), and a known internal combustion engine or electric motor can be used as the power source 12. The power transmission mechanism 13 is configured to be able to transmit power of the power source 12 to the wheels 11, and power corresponding to a gear ratio of a transmission is typically transmitted to the rear wheel.

The driving operation mechanism 14 is configured to be able to receive an operation input required for a driving operation of the straddle type vehicle 1, and in the present embodiment, the driving operation mechanism 14 includes an acceleration operator 14*a*, a braking operator 14*b*, a steering operator 14*c*, and a gear shift operator 14*d*. Most of the operators 14*a* to 14*d* can be provided in a handlebar in the present embodiment, but may be partially provided in another portion of a vehicle body. The acceleration operator 14*a* is an operator for performing an acceleration operation, and the braking operator 14*b* is an operator for performing a braking operation. The steering operator 14*c* is an operator for performing a steering operation, and typically, rotation of the handlebar in a left-and-right direction corresponds to the steering operation. The gear shift operator 14*d* is an operator for changing the gear ratio of the transmission.

The braking apparatus 17 can individually apply a braking force to the front and rear wheels, and a known mechanism may be adopted to realize this. In the present embodiment, the braking apparatus 17 includes a brake disk 17*a* for braking the wheel 11, a caliper 17*b* for clamping the brake disk 17*a*, a hydraulic modulator 17*c* for supplying hydraulic pressure to the caliper 17*b*, a hose connecting these, a brake pipe such as a pipe, and the like.

The monitoring apparatus 15 is configured to be able to monitor a state of the periphery of the straddle type vehicle 1, thereby being able to detect the presence or absence of an object in the periphery of the straddle type vehicle 1 and specify the distance therebetween. As the monitoring apparatus 15, a camera including a CCD/CMOS image sensor or the like can be used, but additionally/alternatively, another distance measurement apparatus such as a millimeter wave radar, a light detection and ranging (LiDAR), or the like may be used.

The straddle type vehicle 1 further includes a driving assistance apparatus 16. The driving assistance apparatus 16 includes a central processing unit (CPU) 16*a* and a memory 16*b*, and can realize predetermined driving assistance based on a monitoring result of the monitoring apparatus 15. The driving assistance indicates that the driving assistance apparatus 16 performs at least a part of the driving operation described above instead of a driver (rider). However, in the driving assistance according to the present embodiment, it is assumed that adaptive cruise control (ACC) for causing the straddle type vehicle 1 to follow another vehicle (hereinafter, referred to as a "preceding vehicle") traveling in front of the straddle type vehicle 1 is performed. That is, in the ACC, the driving assistance apparatus 16 performs acceleration control and/or braking control instead of the acceleration operation and/or the braking operation by the driver.

That is, at the time of acceleration of the straddle type vehicle 1, the power source 12 is controlled based on the operation amount of the acceleration operator 14*a* in a state where the driving assistance function is deactivated, and is controlled based on a control signal from the driving assistance apparatus 16 in a state where the driving assistance function is activated, thereby generating power. Further, at the time of deceleration of the straddle type vehicle 1, the braking apparatus 17 is controlled based on the operation amount of the braking operator 14*b* in a state where the driving assistance function is deactivated, and is controlled based on a control signal from the driving assistance apparatus 16 in a state where the driving assistance function is activated, thereby applying the braking force to the wheel 11.

In the ACC, the driving assistance apparatus 16 performs the acceleration control and/or the braking control such that an inter-vehicle time (Time-Head Way (THW)) between the straddle type vehicle 1 and the preceding vehicle is maintained, and the inter-vehicle distance is adjusted such that the inter-vehicle time becomes a predetermined value (for example, 1 second or the like). That is, the inter-vehicle distance between the straddle type vehicle 1 and the preceding vehicle decreases as a vehicle speed decreases, and increases as the vehicle speed increases.

The driving assistance function is realized by the CPU 16*a* executing a predetermined program while developing the program on the memory 16*b*, but may be executed by an application-specific integrated circuit (ASIC). That is, the driving assistance function may be realized by either hardware or software, may be incorporated in a semiconductor apparatus by a circuit, or may be executed based on an instruction of a computer by a processor with a memory.

Since the vehicle speed of the preceding vehicle is generally irrelevant to the intention of the driver of the self-vehicle, the ACC decelerates the self-vehicle when the preceding vehicle decelerates, and accelerates the self-vehicle when the preceding vehicle accelerates. However, it is generally difficult to stabilize the traveling of the straddle type vehicle 1 at a relatively low vehicle speed. Therefore, in the present embodiment, a mode of the driving assistance can be changed according to the vehicle speed.

Figure 2:
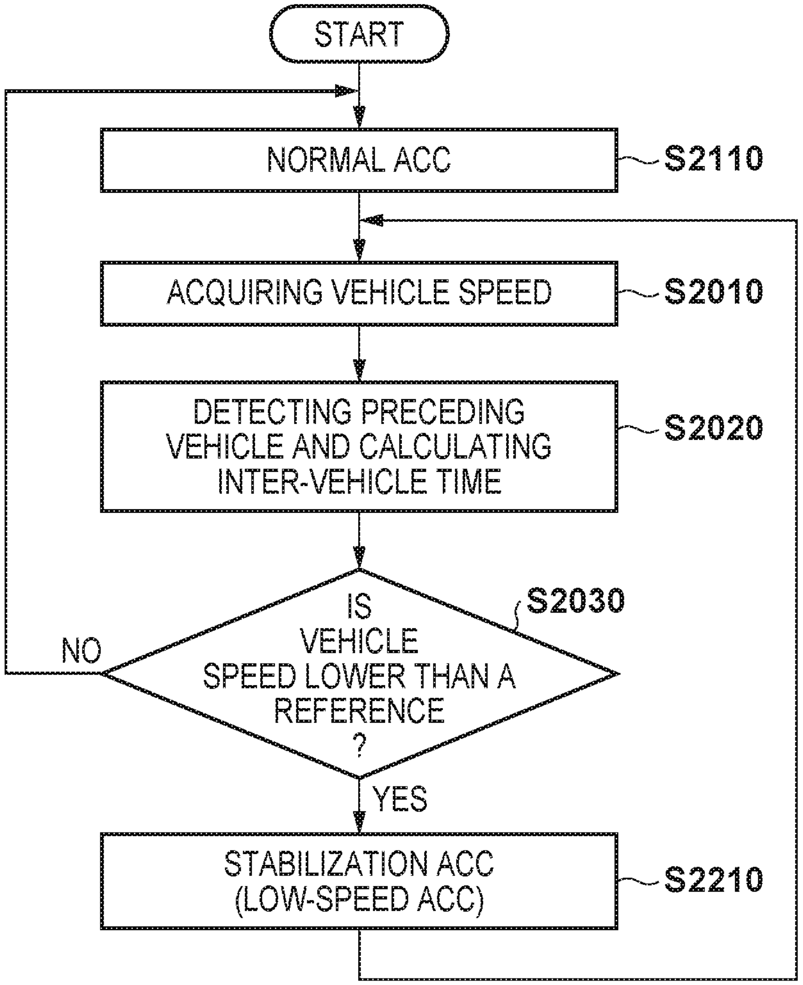
FIG. 2 is a flowchart illustrating an outline of driving assistance by a driving assistance apparatus.

FIG. 2 is a flowchart illustrating an outline of the driving assistance by the driving assistance apparatus 16. This flowchart is performed when the preceding vehicle is detected and the execution of the ACC is started, and each step is mainly executed by the CPU 16*a*.

In step S2110 (hereinafter, simply referred to as "S2110", and the same applies to the other steps to be described later), a driving assistance mode is set to normal ACC. Details of the normal ACC will be described later.

In S2010, the vehicle speed of the straddle type vehicle 1 is acquired. The vehicle speed of the straddle type vehicle 1 may be calculated from the rotation speed of the wheels 11, and a known vehicle speed sensor can be used.

In S2020, the inter-vehicle time with the preceding vehicle is calculated. As described above, the preceding vehicle is detected based on the monitoring result by the monitoring apparatus 15. In addition, the inter-vehicle time can be calculated based on the inter-vehicle distance between the straddle type vehicle 1 and the preceding vehicle and the vehicle speed of the straddle type vehicle 1.

In S2030, it is determined whether or not the vehicle speed of the straddle type vehicle 1 is lower than a reference. This reference is set to 30 km/h in the present example, but may be a predetermined value larger than 0 km/h and may be set based on a parameter (for example, a weight or the like) related to the traveling stability of the straddle type vehicle 1. When the vehicle speed of the straddle type vehicle 1 is lower than the reference, the process proceeds to S2210. Otherwise, the process returns to S2110. This determination may proceed to S2210 when the vehicle speed is equal to or lower than the reference, and proceed to S2110 when the vehicle speed is higher than the reference.

In S2210, the driving assistance mode is set to stabilization ACC. Details of the stabilization ACC will be described later.

In short, in S2110, the normal ACC is performed such that the inter-vehicle time becomes the predetermined value based on the fact that the vehicle speed of the straddle type vehicle 1 is equal to or higher than the reference. On the other hand, in S2210, the stabilization ACC is performed such that the inter-vehicle time becomes the predetermined value as another ACC different from the normal ACC based on the fact that the vehicle speed of the straddle type vehicle 1 is less than the reference.

In general, it is relatively easy to stabilize the traveling of the straddle type vehicle 1 when the vehicle speed is equal to or higher than the reference, but it is relatively difficult to stabilize the traveling of the straddle type vehicle 1 when the vehicle speed is less than the reference. Therefore, the ACC of S2110 can be performed in a known mode, whereas the ACC of S2210 is performed in a mode in which the stabilization of the traveling is prioritized. From such a viewpoint, in the present specification, the ACC of S2110 is expressed as the "normal ACC", the ACC of S2210 is expressed as the "stabilization ACC", and these are distinguished and expressed.

In the stabilization ACC according to the present embodiment, the acceleration control is performed simultaneously with the braking control, and the traveling is maintained with the braking control, so that it is possible to increase the front-rear wheel load with respect to a traveling surface. The acceleration control and the braking control can be performed by the driving assistance apparatus 16 outputting individual control signals to the power source 12 and the braking apparatus 17, respectively. In addition, the braking control can be generally executed individually for the front wheel and the rear wheel, and the braking force for the front wheel and the rear wheel at the time of acceleration and deceleration is individually adjusted, so that the vehicle body can be more reliably stabilized.

On the other hand, in the normal ACC, the acceleration control and the braking control are executed independently, that is, the driving assistance apparatus 16 does not perform the braking control at the time of performing the acceleration control, and does not perform the acceleration control at the time of performing the braking control.

In order to ensure further safety, the inter-vehicle time secured by the stabilization ACC may be set to be larger than the inter-vehicle time secured by the normal ACC. The stabilization ACC may be expressed as low-speed ACC or the like.

In the normal ACC and the stabilization ACC, the control amounts (signal values corresponding to the operation amounts of the acceleration operation and the braking operation, traveling parameters capable of realizing a desired traveling mode, or other signal values) of the acceleration control and the braking control may be determined based on the vehicle speed of the straddle type vehicle 1 acquired in S2010 and the inter-vehicle time calculated in S2020. For example, the straddle type vehicle 1 accelerates when the control amount of the acceleration control increases, and decelerates when the control amount of the braking control increases.

As described above, according to the present embodiment, the driving assistance apparatus 16 executes the stabilization ACC that performs the acceleration control simultaneously with the braking control when the vehicle speed of the straddle type vehicle 1 is lower than the reference. Since the braking control is substantially continued during the execution of the stabilization ACC, the acceleration control is performed simultaneously with (or with) the braking control. According to such stabilization ACC, the front-rear wheel load with respect to the traveling surface increases, so that the traveling of the straddle type vehicle 1 can be stabilized even when the vehicle speed is relatively low, and the follow-traveling of the straddle type vehicle 1 with respect to the preceding vehicle can be realized.

Since the front-rear wheel load can be adjusted by the braking force on the wheels 11, the stabilization ACC may be performed such that the front-rear wheel load is further increased, when the vehicle speed is lower. That is, as the vehicle speed of the straddle type vehicle 1 decreases, both the control amount of the acceleration control and the control amount of the braking control may be increased, so that the low vehicle speed may be maintained.

Since the vehicle speed of the preceding vehicle is generally irrelevant to the intention of the driver of the self-vehicle, the acceleration control and the braking control in the stabilization ACC according to the present embodiment need to be adjusted based on the traveling mode of the preceding vehicle. Hereinafter, a method for realizing the stabilization ACC according to the present embodiment will be described with some scenes illustrated.

First Example

Figure 3:
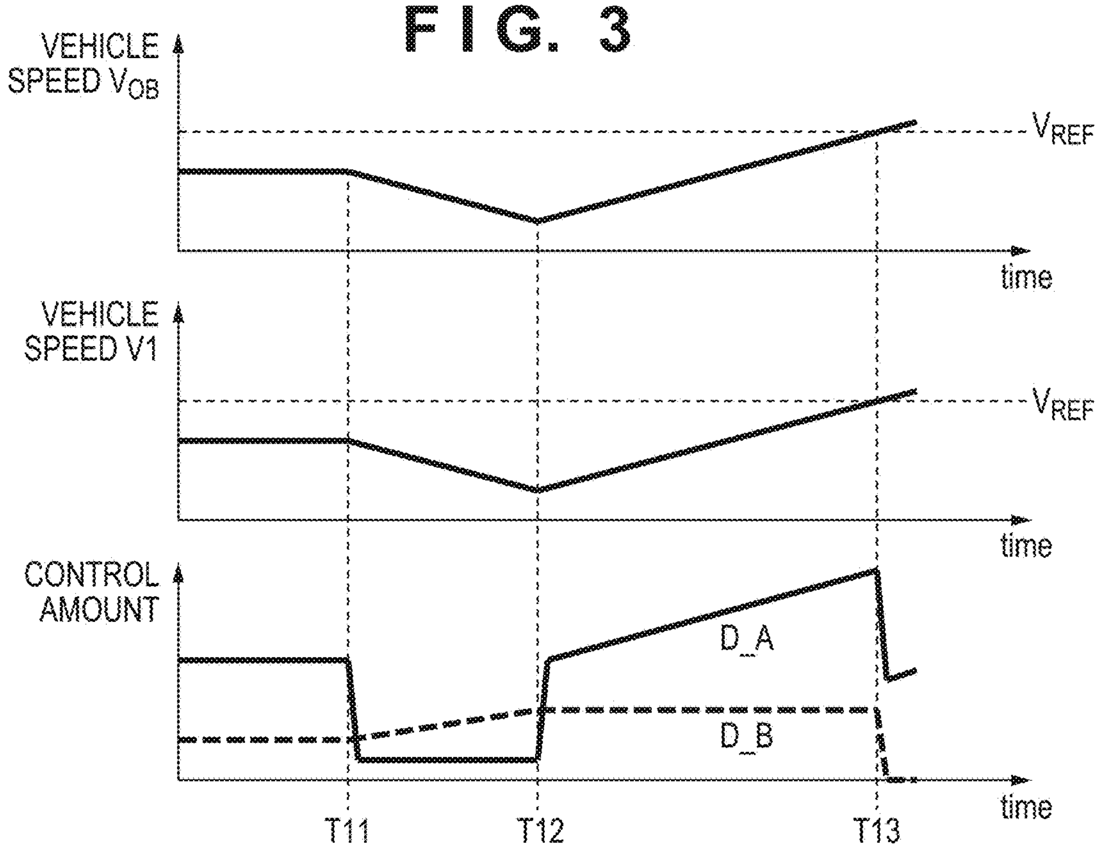
FIG. 3 is a timing chart illustrating an example of control contents of stabilization ACC.

FIG. 3 illustrates a timing chart when the stabilization ACC is being executed (when a vehicle speed V1 of the straddle type vehicle 1 is lower than a reference $V_{REF}$) and the preceding vehicle accelerates after decelerating. A horizontal axis in the drawing is a time axis. A vertical axis indicates a vehicle speed $V_{OB}$ of the preceding vehicle, the vehicle speed V1 of the straddle type vehicle 1, and a control amount D_A of the acceleration control and a control amount D_B of the braking control of the straddle type vehicle 1.

For ease of understanding, it is assumed that there is substantially no delay between the vehicle speeds $V_{OB}$ and V1. It is assumed that acceleration or deceleration is determined based on a difference between the control amount D_A and the control amount D_B, and the vehicle speed V1 is maintained when the difference is constant. Although the control amounts D_A and D_B are illustrated side by side for comparison, their dimensions are not exact, that is, they are merely schematically illustrated. In addition, the straddle type vehicle 1 accelerates when the control amount D_A is larger than the control amount D_B and the difference therebetween increases, and the straddle type vehicle 1 decelerates when the control amount D_A is smaller than the control amount D_B and the difference therebetween increases.

Until time T11, the vehicle speed $V_{OB}$ and the vehicle speed V1 are equal to each other and constant ($V_{OB}=V1<V_{REF}$), the vehicle speed $V_{OB}$ decreases at times T11 to T12, and the vehicle speed V1 decreases accordingly. At this time, according to the stabilization ACC according to the present embodiment, the driving assistance apparatus 16 suppresses the acceleration control to decrease the control amount D_A thereof (or to substantially 0), and increases the control amount D_B of the braking control at the same time. As a result, the vehicle speed V1 decreases, and at that time, the control amount D_B of the braking control increases, so that the straddle type vehicle 1 can be decelerated while the traveling of the straddle type vehicle 1 is further stabilized. In addition, the control amount D_A decreases, so that fuel or electric power required to drive the power source 12 is suppressed, and energy saving can be achieved.

Thereafter, the vehicle speed $V_{OB}$ increases at times T12 to T13, and the vehicle speed V1 increases accordingly. At this time, according to the stabilization ACC according to the present embodiment, the driving assistance apparatus 16 resumes the acceleration control while maintaining the control amount D_B of the braking control and increases the control amount D_A thereof. As a result, the vehicle speed V1 increases, and at that time, the control amount D_B of the braking control is maintained, so that the straddle type vehicle 1 can be accelerated while the stabilization of the traveling of the straddle type vehicle 1 is maintained.

Second Example

Figure 4:
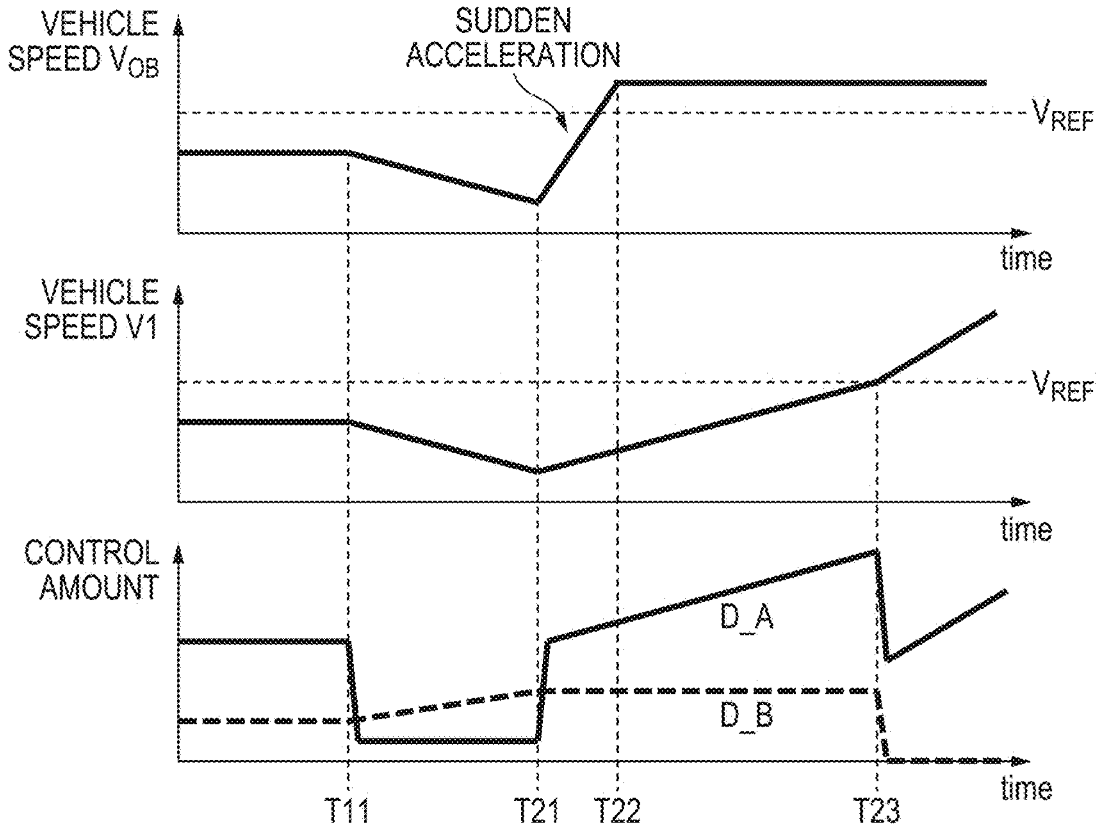
FIG. 4 is a timing chart illustrating an example of control contents of the stabilization ACC.

FIG. 4 illustrates a timing chart when the stabilization ACC is being executed (when the vehicle speed V1 of the straddle type vehicle 1 is lower than the reference $V_{REF}$) and the preceding vehicle suddenly accelerates, similarly to FIG. 3. The sudden acceleration referred to herein indicates that the acceleration is larger than an allowable value, and the allowable value may be set based on a value that is generally called that unnecessary G occurs for the driver.

When the vehicle speed $V_{OB}$ suddenly increases due to sudden acceleration of the preceding vehicle at times T21 to T22, the vehicle speed V1 increases such that the acceleration does not exceed the allowable value until the vehicle speed V1 reaches the reference $V_{REF}$. Since the stabilization ACC is switched to the normal ACC after time T23 when the vehicle speed V1 reaches the reference $V_{REF}$, the braking control is suppressed, and the acceleration control can be performed such that the follow-traveling by the straddle type vehicle 1 is realized. That is, when the preceding vehicle accelerates at an acceleration larger than the allowable value, the straddle type vehicle 1 accelerates at an acceleration smaller than the acceleration of the preceding vehicle until the vehicle speed V1 reaches the reference $V_{REF}$.

According to the present example, the inter-vehicle distance between the straddle type vehicle 1 and the preceding vehicle temporarily increases, but after the vehicle speed V1 reaches the reference $V_{REF}$, the inter-vehicle distance decreases again such that the inter-vehicle time becomes a predetermined value. As described above, when the vehicle speed V1 is relatively low, the change in acceleration is decreased, so that the traveling of the straddle type vehicle 1 can be more reliably stabilized. In addition, the inter-vehicle distance temporarily increases, so that further safety can be ensured.

On the other hand, when the preceding vehicle accelerates at an acceleration smaller than the allowable value, the stabilization ACC may be performed such that the vehicle speed V1 follows the vehicle speed $V_{OB}$ until the vehicle speed V1 reaches the reference $V_{REF}$, similarly to the first example described above.

Note that FIG. 4 illustrates a mode in which the acceleration increases after the time T23, but the acceleration may remain constant, so that the inter-vehicle time between the straddle type vehicle 1 and the preceding vehicle can be set to a predetermined value.

In the first and second examples, for ease of understanding, the outline of the stabilization ACC has been described assuming that the vehicle speeds $V_{OB}$ and V1 linearly increase or decrease (acceleration is constant), but actually, the vehicle speeds $V_{OB}$ and V1 increase or decrease while the acceleration varies. Therefore, in the stabilization ACC, the control amounts D_A and D_B may be adjusted such that G that can be applied to the driver falls within an allowable range.

Third Example

The stabilization ACC according to the present embodiment does not cause the straddle type vehicle 1 to follow the preceding vehicle by simply performing the acceleration control or the braking control, but increases the front-rear wheel load with respect to the traveling surface by performing the acceleration control while performing the braking control, thereby making it possible to stabilize the traveling of the straddle type vehicle 1. However, it is said that the effect is obtained while the straddle type vehicle 1 is traveling (in other words, until the straddle type vehicle 1 stops). Therefore, the stabilization ACC can be interrupted when the straddle type vehicle 1 is in a stopped state. Thereafter, when an operation input for starting the straddle type vehicle 1 is performed, the interrupted stabilization ACC may be resumed in response to the operation input.

The operation input (operation input mainly indicating the acceleration operation) for starting the straddle type vehicle 1 can be acquired based on a signal from the driving operation mechanism 14. Alternatively, a button switch for instructing to start the driving assistance by the ACC may be provided in the driving operation mechanism 14, that is, the driving operation mechanism may be configured to be able to detect an operation indicating an intention of the driver to start the straddle type vehicle 1.

Figure 5:
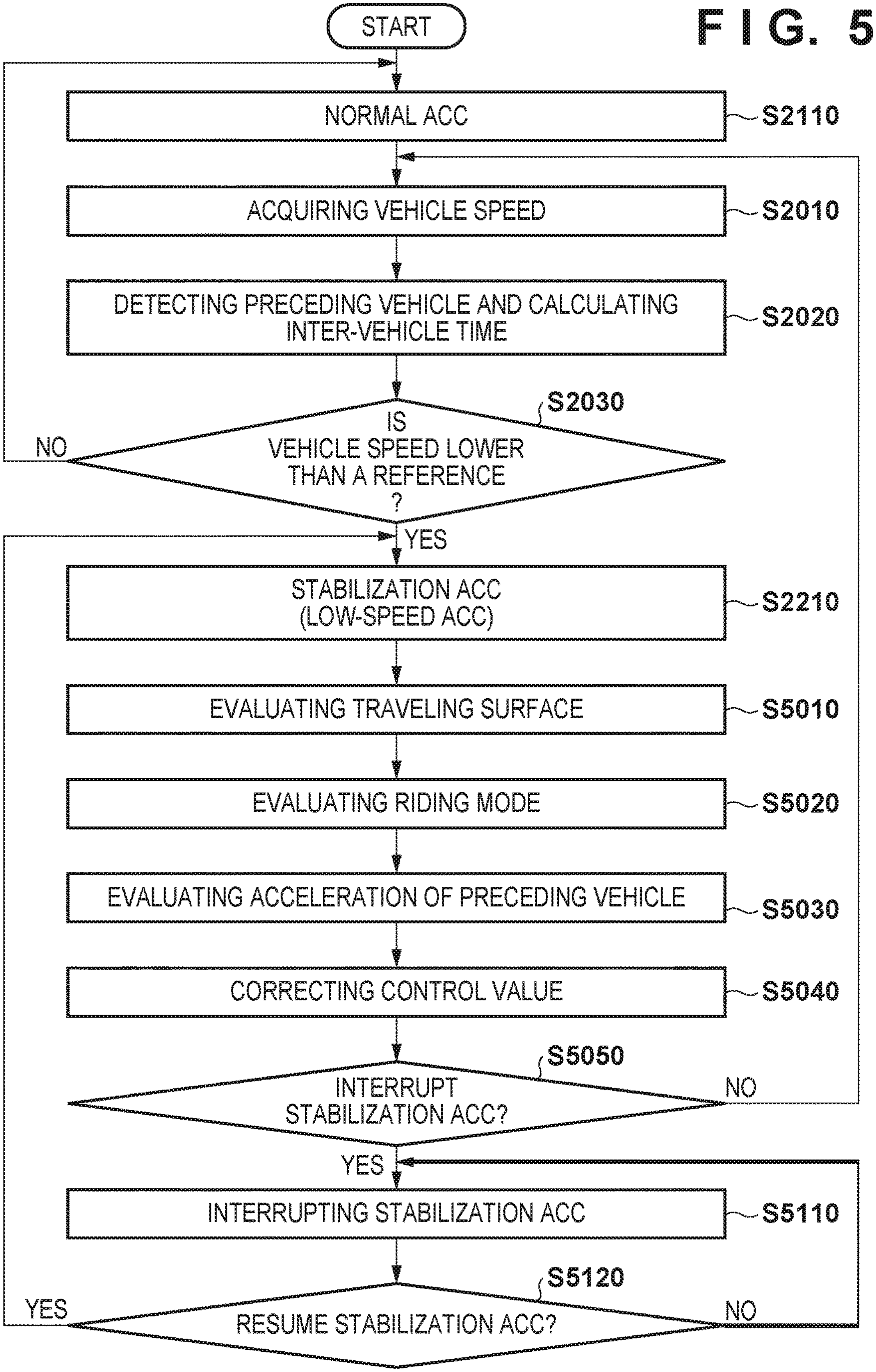
FIG. 5 is a flowchart illustrating detailed contents of driving assistance by the driving assistance apparatus.

FIG. 5 is a flowchart illustrating an example of a further utilization mode of the stabilization ACC described above, and illustrates contents of driving assistance in consideration of a more detailed traveling scene. Similarly to FIG. 2, each step of this flowchart is mainly executed by the CPU 16*a*.

Since the contents of S2110 to S2210 are similar to those in FIG. 2, the description thereof is omitted. In this example, S2210 is followed by S5010 to S5120.

In S5010, the traveling surface of the straddle type vehicle 1 is evaluated. In the stabilization ACC, as described above, in order to further ensure the stabilization of the vehicle body, the braking force on the front wheel and the rear wheel at the time of acceleration and deceleration can be individually adjusted. On the other hand, it is considered that the braking force requires further adjustment depending on the state of the traveling surface. For example, in a case where an inclination angle of the traveling surface is larger than a reference angle (for example, +5 degrees) (that is, in a case of uphill), a large propulsion force is required, or in a case where the inclination angle is smaller than another reference angle (for example, −5 degrees) (that is, in a case of downhill), a small propulsion force is sufficient, and it can be said that the front-rear wheel load with respect to such a traveling surface requires further adjustment for each of the front wheel and the rear wheel. As another example, the same applies to an environment of the traveling surface (whether it is a paved traveling surface, an unpaved traveling surface, or a bad road which is likely to slip due to rain or the like), and the further adjustment may be required. Therefore, in this step, the traveling surface is evaluated.

In S5020, a riding mode is evaluated. For example, since the center of gravity of the vehicle body can vary depending on the weight of the driver, the presence or absence of luggage, the presence or absence of a passenger, and the like, the further adjustment may be required depending on the riding mode. Therefore, in this step, the riding mode is evaluated.

In S5030, the acceleration of the preceding vehicle is evaluated. As in the second example described with reference to FIG. 4, the further adjustment may be required depending on the acceleration mode of the preceding vehicle. Therefore, in this step, the acceleration of the preceding vehicle is evaluated.

In S5040, the control values of the acceleration control and the braking control are corrected based on the evaluation results obtained in S5010 to S5030 described above such that the stabilization ACC is more appropriately realized. The correction may be performed by a predetermined arithmetic expression using the results of these evaluations. For example, the control amounts of the acceleration control and the braking control are corrected by weighted addition, and in particular, in order to further ensure the stabilization of the vehicle body, the further adjustment (adjustment of the front-rear wheel load for each of the front wheel and the rear wheel) is performed at the time of correcting the control amount of the braking control.

In S5050, it is determined whether or not it is necessary to interrupt the stabilization ACC. Since it may be difficult to continue the stabilization ACC, in such a case, it is conceivable to interrupt the stabilization ACC until the stabilization ACC can be continued again. Examples thereof include:

- a case where yawing or rolling outside an allowable range occurs in the straddle type vehicle 1 (for example, a case where a yaw rate or a roll rate is equal to or larger than an allowable value, and 20 degrees/second can be set as an example of the allowable value);
- a case where the straddle type vehicle 1 turns at a turning angle outside an allowable range (for example, a case where a bank angle or a steering angle is equal to or larger than an allowable angle, and 20 degrees can be set as an example of the allowable value);
- a case where the straddle type vehicle 1 is in a substantially stopped state (for example, a case where the vehicle speed of the straddle type vehicle 1 is less than the reference value, and 1 km/h can be set as an example of the reference value); and the like. When at least one of them is satisfied, the process proceeds to S5110, and when none of them is satisfied, the process returns to S2010.

In S5110, the stabilization ACC is interrupted. At this time, the control amount corrected in S5040 may be temporarily held or stored in the memory 16*b*, for example, such that the further adjusted front-rear wheel load is realized again when the interrupted stabilization ACC is resumed later.

In S5120, it is determined whether or not the interrupted stabilization ACC can be resumed. Examples in which the stabilization ACC can be resumed include: a case where there is a preceding vehicle in front of the straddle type vehicle 1 and an operation indicating an intention of starting the straddle type vehicle 1 by the driver is input, for example,

- a case where an acceleration operation is input (for example, a case where a throttle opening is equal to or larger than a reference value, 20 degrees may be set as an example of the reference value);
- a case where an operation instructing to start the driving assistance by the ACC is input; and the like. As another example, there may be a case where there is a preceding vehicle in front of the straddle type vehicle 1 and the straddle type vehicle 1 is in a sufficient traveling state (for example, a case where the vehicle speed of the straddle type vehicle 1 becomes equal to or higher than a reference value, and 10 km/h or the like can be set as an example of the reference value). When the stabilization ACC can be resumed, the process returns to S2210. Otherwise, the process returns to S5110.

According to such a utilization mode of the stabilization ACC, even when the vehicle speed is relatively low, the traveling of the straddle type vehicle 1 can be stabilized by increasing the front-rear wheel load with respect to the traveling surface in various traveling environments, and the follow-traveling of the straddle type vehicle 1 with respect to the preceding vehicle can be appropriately realized.

With respect to the above flowchart, the same applies to FIG. 2, but the order of steps may be changed without departing from the spirit thereof, and other steps may be added or partially omitted. For example, the evaluation processing in S5010 to S5030 described above may be collectively performed, partially omitted, performed immediately before S2210, and/or combined with other known evaluation processing.

In the foregoing descriptions, for ease of understanding, each element is denoted with a name related to its functional aspect, but the element is not limited to an element that has a content described in the foregoing embodiments as its main function, and may instead have the content as its complementary function. Thus, each element may be replaced with a similar expression without being limited by its expression. For the same purpose, the expression "apparatus" may be replaced with "unit", "part (component, piece)", "member", "structure", "assembly" or the like, or may be omitted or attached.

In addition, two or more elements selectively illustrated in the embodiments are not strictly limited to the illustration thereof, and may be arbitrarily combined. For example, each of the two or more elements illustrated in the examples may be additionally or alternatively selected. As an example, in a case where two elements of A and B can be arbitrarily combined, it may be expressed as "A and/or B" or as "at least one of A and B" as indicating any one of only A, only B, and both A and B.

Summary of Embodiments

Some features exemplified in the embodiments are as follows:

As a first aspect, a driving assistance apparatus (16) is mountable on a straddle type vehicle (1), the driving assistance apparatus comprising:

- a first detection unit (S2010) configured to detect a vehicle speed of the straddle type vehicle;
- a second detection unit (S2020) configured to detect a preceding vehicle traveling in front of the straddle type vehicle; and
- a control unit (S2110, S2210) configured to perform acceleration control and braking control of the straddle type vehicle, wherein
- when the vehicle speed (V1) of the straddle type vehicle is lower than a reference ($V_{REF}$), the control unit performs follow-traveling with respect to the preceding vehicle by performing the acceleration control simultaneously with the braking control (S2210).

As a result, even when the vehicle speed is relatively low, the traveling of the straddle type vehicle can be stabilized by increasing the front-rear wheel load, and ACC can be appropriately realized.

As a second aspect, when the vehicle speed of the straddle type vehicle is lower than the reference, the control unit increases both a control amount of the acceleration control and the control amount of the braking control as the vehicle speed decreases.

As a result, even if the vehicle speed further decreases, the front-rear wheel load can be further increased until the straddle type vehicle is in a stopped state, so that the traveling of the straddle type vehicle can be stabilized.

As a third aspect, when the vehicle speed of the straddle type vehicle is lower than the reference and a deceleration of the preceding vehicle is detected by the detection unit, the control unit suppresses the acceleration control and increases a control amount of the braking control.

As a result, since the front-rear wheel load can be further increased even if the vehicle speed further decreases, the straddle type vehicle can be decelerated while the traveling of the straddle type vehicle is stabilized. In addition, it is possible to suppress consumption of fuel or electric power required to drive the power source by suppression of the acceleration control, which can be advantageous for energy saving.

As a fourth aspect, when an acceleration of the preceding vehicle is detected by the detection unit, the control unit increases the control amount of the acceleration control while maintaining the control amount of the braking control.

As a result, the control amount of the braking control is maintained, so that it is possible to maintain the front-rear wheel load and to maintain the stabilization of the traveling of the straddle type vehicle, and at the same time, it is possible to accelerate the straddle type vehicle.

As a fifth aspect, when the vehicle speed of the straddle type vehicle is lower than the reference, and an acceleration of the preceding vehicle is detected by the detection unit and the acceleration of the preceding vehicle is larger than a predetermined value, the control unit accelerates the straddle type vehicle at an acceleration smaller than the acceleration of the preceding vehicle until the vehicle speed of the straddle type vehicle reaches the reference.

As a result, it is possible to prevent the straddle type vehicle from following the sudden acceleration of the preceding vehicle.

As a sixth aspect, when the vehicle speed of the straddle type vehicle is lower than the reference, and an acceleration of the preceding vehicle is detected by the detection unit and the acceleration of the preceding vehicle is smaller than a predetermined value, the control unit accelerates the straddle type vehicle by increasing a control amount of the acceleration control while maintaining the control amount of the braking control until the vehicle speed of the straddle type vehicle reaches the reference.

As a result, the control amount of the braking control is maintained, so that the straddle type vehicle can follow the acceleration of the preceding vehicle at the allowable acceleration while maintaining the front-rear wheel load and maintaining the stabilization of the traveling of the straddle type vehicle.

As a seventh aspect, the driving assistance apparatus further comprises:

an acquisition unit configured to acquire an operation input for starting the straddle type vehicle, wherein the control unit interrupts the acceleration control and the braking control when the straddle type vehicle is in a stopped state, and resumes the interrupted acceleration control and braking control in response to the operation input.

As a result, an intention of a driver to use the driving assistance is appropriately detected, and the driving assistance is appropriately resumed accordingly.

As an eighth aspect, the reference is 30 kilometers per hour.

This value can be set based on a parameter (for example, the weight or the like) related to the stability of the traveling of the straddle type vehicle.

As a ninth aspect, the control unit outputs a control signal to each of a power source (12) of the straddle type vehicle and a braking apparatus (17) of the straddle type vehicle such that the acceleration control is performed by controlling the power source and the braking control is performed by controlling the braking apparatus.

As a result, the acceleration control and the braking control can be individually and appropriately performed.

As a tenth aspect, a method for assisting driving of a straddle type vehicle (1) comprises:

a step (S2010) of detecting a vehicle speed of the straddle type vehicle;

a step (S2020) of detecting a preceding vehicle traveling in front of the straddle type vehicle; and a step (S2110, S2210) of performing acceleration control and braking control of the straddle type vehicle, wherein when the vehicle speed (V1) of the straddle type vehicle is lower than a reference ($V_{REF}$), the step of performing control performs follow-traveling with respect to the preceding vehicle by performing the acceleration control simultaneously with the braking control (S2210).

As a result, even when the vehicle speed is relatively low, the traveling of the straddle type vehicle can be stabilized by increasing the front-rear wheel load, and ACC can be appropriately realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A driving assistance apparatus mountable on a straddle type vehicle, the driving assistance apparatus comprising:

a first detection unit configured to detect a vehicle speed of the straddle type vehicle;

a second detection unit configured to detect a preceding vehicle traveling in front of the straddle type vehicle; and a control unit configured to perform acceleration control and braking control of the straddle type vehicle, wherein when the vehicle speed of the straddle type vehicle is lower than a reference, the control unit performs stabilization follow-traveling with respect to the preceding vehicle by performing the acceleration control simultaneously with the braking control, to stabilize the straddle type vehicle, when the vehicle speed of the straddle type vehicle is lower than the reference and an acceleration of the preceding vehicle is detected by the second detection unit, the control unit increases the control amount of the acceleration control while maintaining the control amount of the braking control.

2. The driving assistance apparatus according to claim 1, wherein when the vehicle speed of the straddle type vehicle is lower than the reference, and an acceleration of the preceding vehicle is detected by the second detection unit and the acceleration of the preceding vehicle is larger than a predetermined value, the control unit accelerates the straddle type vehicle at an acceleration smaller than the acceleration of the preceding vehicle until the vehicle speed of the straddle type vehicle reaches the reference.

3. The driving assistance apparatus according to claim 1, further comprising:

an acquisition unit configured to acquire an operation input for starting the straddle type vehicle, wherein the control unit interrupts the acceleration control and the braking control when the straddle type vehicle is in a stopped state, and resumes the interrupted acceleration control and braking control in response to the operation input.

4. The driving assistance apparatus according to claim 1, wherein the reference is 30 kilometers per hour or less.

5. The driving assistance apparatus according to claim 1, wherein the control unit outputs a control signal to each of a power source of the straddle type vehicle and a braking apparatus of the straddle type vehicle such that the acceleration control is performed by controlling the power source and the braking control is performed by controlling the braking apparatus.

6. The driving assistance apparatus according to claim 1, wherein the reference is a value which is set based on a parameter relating to a stabilization for the traveling of the straddle type vehicle, to be more than 0 kilometers per hour, the parameter including a weight of the straddle type vehicle.

7. A driving assistance apparatus mountable on a straddle type vehicle, the driving assistance apparatus comprising:

a first detection unit configured to detect a vehicle speed of the straddle type vehicle;

a second detection unit configured to detect a preceding vehicle traveling in front of the straddle type vehicle; and a control unit configured to perform acceleration control and braking control of the straddle type vehicle, wherein when the vehicle speed of the straddle type vehicle is lower than a reference, the control unit performs stabilization follow-traveling with respect to the preceding vehicle by performing the acceleration control simultaneously with the braking control, to stabilize the straddle type vehicle, when the vehicle speed of the straddle type vehicle is lower than the reference, and an acceleration of the preceding vehicle is detected by the second detection unit and the acceleration of the preceding vehicle is smaller than a predetermined value, the control unit accelerates the straddle type vehicle by increasing a control amount of the acceleration control while maintaining the control amount of the braking control until the vehicle speed of the straddle type vehicle reaches the reference.

* * * * *